No. 824,747. PATENTED JULY 3, 1906.
C. SCHMIDT.
MOTOR VEHICLE RUNNING GEAR.
APPLICATION FILED NOV. 5, 1904.
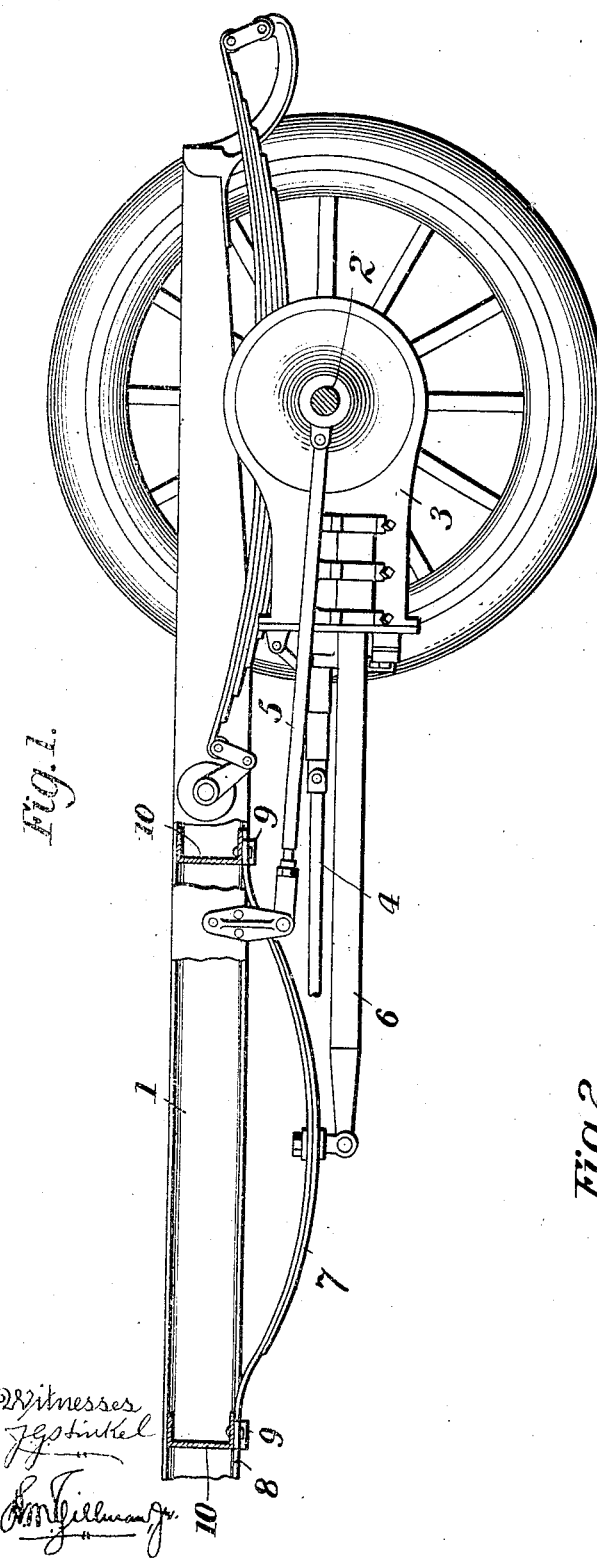
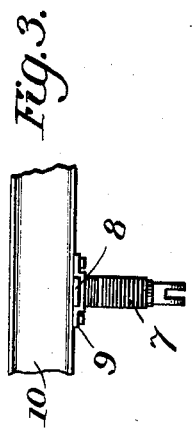
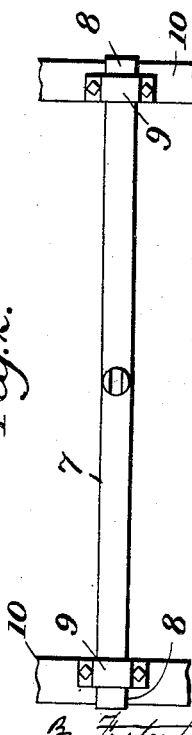
Witnesses
Inventor
Charles Schmidt
By Foster Freeman & Watson
Attorneys

UNITED STATES PATENT OFFICE.

CHARLES SCHMIDT, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE RUNNING-GEAR.

No. 824,747.  Specification of Letters Patent.  Patented July 3, 1906.

Application filed November 5, 1904. Serial No. 231,571.

*To all whom it may concern:*

Be it known that I, CHARLES SCHMIDT, a citizen of the Republic of France, and a resident of Detroit, Wayne county, State of Michigan, have invented certain new and useful Improvements in Motor-Vehicle Running-Gear, of which the following is a specification.

In automobile running-gear the rear or driving-axle reacts upon the gearing which turns it, tending to rotate said gearing about the axle, or, in other words, the driving-gear which operates upon the differential gear of the driving-axle tends to revolve bodily about the rear axle. To prevent this action, the casing or frame in which the gearing is mounted must be connected with the main frame of the running-gear, and on account of the relative movement between the frame and the axle this connection must be through some yielding medium.

The present invention relates to the particular form of connection between the driving-gear case and the main frame whereby the gear-case is held in proper relation to the rear axle.

The invention will be described in detail in connection with the accompanying drawings, in which—

Figure 1 is a side elevation of so much of an automobile as is necessary to illustrate the invention, parts being shown in section. Fig. 2 is a bottom plan view of the cushioning-spring, and Fig. 3 is an end view thereof.

Referring to the drawings, 1 indicates the main frame, 2 the rear axle; 3, the gear-case in which the speed-changing and reverse gears are contained, and 4 the driving-shaft which transmits power from the motor to the gears. As usual, adjustable braces 5 connect the frame 1 with the rear axle to prevent forward and backward movement of the axle relative to the main frame and to transmit the propelling power of the axle to the frame.

To prevent the gear-case from "climbing" or rotating about the rear axle, it is provided with an arm 6, projecting forwardly and connected with the main frame by means of a suitable spring. It is desirable that this spring should be flexible vertically and should be adapted to permit a slight longitudinal and lateral movement of the arm 6 relative to the frame to avoid a too rigid construction, which might strain the machine on rough roads. To permit of this range of movement, the outer end of the arm is pivotally connected with the middle of a semi-elliptical spring 7, depending from the main frame and extending longitudinally of the vehicle. As shown, the ends 8 of the spring are arranged to slide in guides 9, connected with cross-bars 10 of the frame 1. These guides are slightly wider than the spring ends to allow a small lateral movement to the arm, which takes place when one rear wheel mounts a higher obstacle than the other. Any other suitable sliding connection between the spring 7 and the main frame may be substituted.

It will be observed that the sliding connection between the spring 7 and the main frame permits the arm 6 to rise and fall slightly and also permits it to move slightly longitudinally and laterally. The rising and falling movement of the arm is limited by the rigidity of the spring, while its longitudinal movement is limited by the braces 5, of which there is one at each side of the machine. The arm 6 is necessarily arranged between the driving-wheels and approximately at the middle of the machine. It is connected rigidly with the gear-case in any suitable manner.

Having described my invention, what I claim, and desire to secure by Letters Patent, is—

1. In a motor-vehicle, the combination with the rear axle and the gear-case arranged at the rear axle, of the main frame, a semi-elliptical spring depending from said main frame and arranged longitudinally of the vehicle, and a forwardly-extending arm rigidly connected with said gear-case and having its free end connected with said spring, for the purpose set forth.

2. In a motor-vehicle, the combination with the rear axle and the gear-case arranged at the rear axle, of the main frame, a semi-elliptical spring depending from said main frame and arranged longitudinally of the vehicle and having sliding connections therewith, and a forwardly-extending arm rigidly connected with said gear-case and pivotally connected with said spring.

3. In a motor-vehicle, the combination with the driving-axle, the gear-case arranged at the driving-axle and an arm rigidly connected with said gear-case, of a main frame having transverse members, a semi-elliptical spring arranged longitudinally of the vehicle and having its ends in sliding connection with said members, and a pivotal joint between said semi-elliptical spring and said arm.

4. In a motor-vehicle, the combination with the rear axle, the gear-case and the arm rigidly connected to said gear-case and extending forward therefrom, of the main frame, braces connecting the rear axle with the main frame, a semi-elliptical spring arranged longitudinally of the vehicle and having its ends in sliding connection with the main frame, and a pivotal joint between said arm and said spring, for the purpose set forth.

5. In a motor-vehicle, the combination with the rear axle and the gear-case, of the main frame, a semi-elliptical spring arranged longitudinally of the vehicle depending from said main frame and connected therewith with freedom to move laterally and longitudinally, and an arm rigidly connected with said gear-case and extending forwardly therefrom and having its forward end connected with said spring.

In testimony whereof I have signed my name to this specification in the presence of two subscribing witnesses.

CHARLES SCHMIDT.

Witnesses:
JNO. J. RAMSEY,
RUSSELL HUFF.